May 22, 1945.  C. J. ROMBERG  2,376,623
LIQUID FLOW OR LEVEL CONTROLLER
Filed Feb. 8, 1943  2 Sheets-Sheet 1
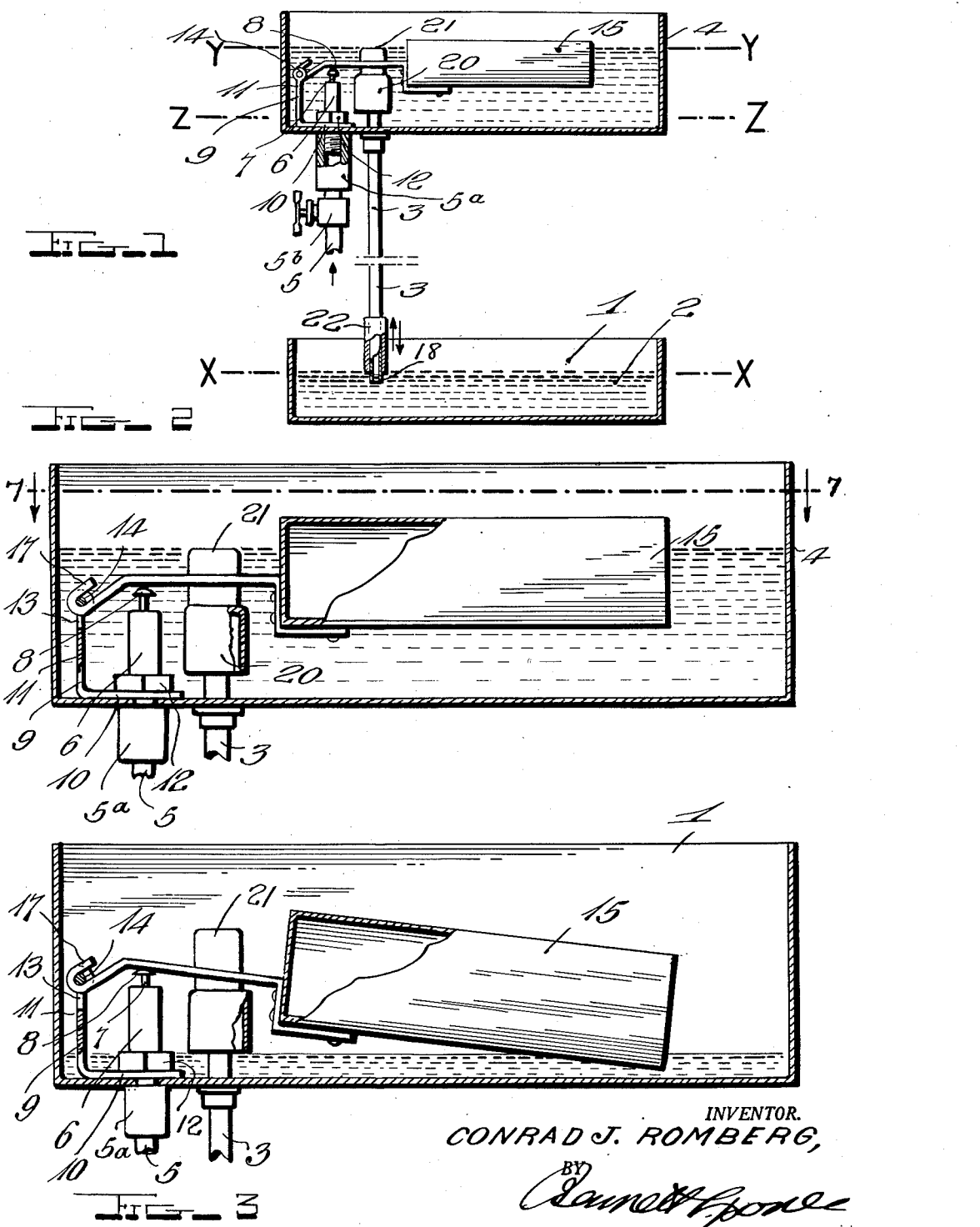
INVENTOR.
CONRAD J. ROMBERG,
BY
ATTORNEY

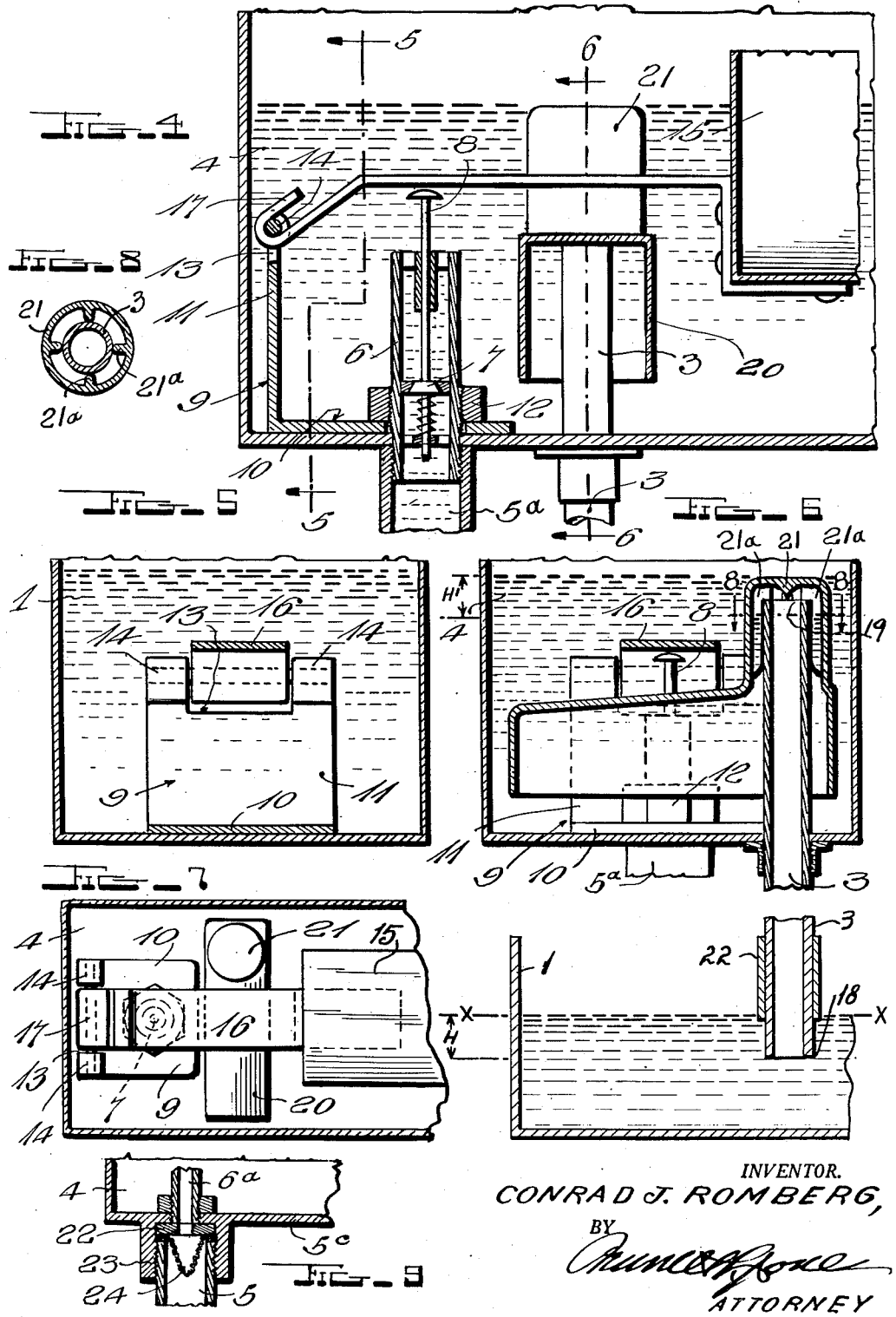

Patented May 22, 1945

2,376,623

UNITED STATES PATENT OFFICE 2,376,623

LIQUID FLOW OR LEVEL CONTROLLER

Conrad Julius Romberg, Gainesville, Ga.

Application February 8, 1943, Serial No. 475,145

2 Claims. (Cl. 137—68)

This invention relates to improvements in liquid flow or level controllers, and particularly to devices of that kind designed to control the flow of water to a receiver from a supply source so as to keep the level of the water in the receiver substantially constant.

The invention, while primarily intended for use in connection with drinking troughs, such as poultry or animal watering troughs, may be employed for supplying water or other liquid to a receiver of any kind to keep the receiver constantly replenished.

One object of the invention is to provide a control device the control portion of which may be disposed in an elevated position above the receiver so that it will not obstruct or occupy any space in the receiver and so that it will be out of the way of and cannot be rendered inoperative by or interfered with or damaged by the fowls or animals drinking from the receiver.

Another object of the invention is to provide a control device which is simple of construction, compact in character, reliable in action, so constructed that it is not liable to clog or otherwise get out of order, and adapted to be manufactured and sold at a comparatively low price.

Still another object of the invention is to provide a controller wherein and whereby the level of the liquid in the receiver and the action of the air are utilized to control the flow of liquid through a delivery tube or pipe in a most reliable and effective manner to keep the liquid in the receiver at the intended level.

Still another object of the invention is to provide a device of this character wherein the flow starting and stopping actions are entirely automatic and controlled by the level of the water in the receiver and a float chamber.

With these and other objects in view, which will appear in the course of the subjoined description, the invention consists of the novel features of construction, combination and arrangement of parts hereinafter fully described and claimed, and shown in the accompanying drawings, in which:

Fig. 1 is a view partly in longitudinal section and partly in side elevation of a liquid receiver and associated control device embodying my invention.

Fig. 2 is a vertical longitudinal section of the same with parts in normal or flow cut off position.

Fig. 3 is a view similar to Fig. 2 with parts in position to allow flow of liquid.

Fig. 4 is a vertical longitudinal section through the float chamber on an enlarged scale.

Figs. 5 and 6 are vertical transverse sections through the float chamber on the lines 5—5 and 6—6 of Fig. 4.

Fig. 7 is a horizontal section on the line 7—7 of Fig. 2.

Fig. 8 is a cross-section on line 8—8 of Fig. 6.

Fig. 9 is a detail view, showing a modification.

Referring now more particularly to the drawings, 1 designates a watering trough or other liquid receiver, designed to contain a body of liquid, as shown at 2, normally maintained at a predetermined level, as the level $x$—$x$. This may be a poultry or animal watering trough of any suitable form and size, or a receptacle for water or other liquid from which portions of the liquid are drawn from time to time and which is automatically replenished with liquid through a delivery or siphon tube or pipe 3 when the liquid level falls to a prescribed degree to keep the level constant.

Arranged above this trough or receiver is a flow control device embodying my invention. This comprises a float tank or chamber 4, preferably of rectangular or oblong rectangular form, and closed at all sides except at the top. This open top may be closed by a removable cover. A pipe 5 is detachably secured to the bottom of this tank by means of a coupling 5$^a$, which may or may not be fixed to the tank, and to this coupling is detachably connected a valve fitting 6 which projects a short distance upwardly into the tank and in which is arranged a spring-closed check valve 7 having a stem portion 8 projecting upwardly therefrom. The pipe 5 is connected in practice with a source of liquid supply whereby liquid is automatically supplied to the tank 4 when the valve 7 is open. In the upper end of this pipe may be mounted a gauze strainer for an obvious purpose, and said end of the pipe may be provided with a control valve 5$^b$, preferably one of needle valve type, to take care of various water supply pressures so that water from the source may be supplied to the tank at a required feed rate.

An L-shaped bracket 9 is disposed in the tank and has a horizontal portion 10 and a vertical portion or arm 11. The portion 10 rests on the bottom of the tank, while the portion 11 extends upwardly a suitable distance above the bottom of the tank. The bracket portion 10 may be suitably secured to the tank bottom. In the present instance it is shown as apertured to receive and embrace the upstanding end of the pipe 5 which is threaded to receive a nut 12 whereby the bracket is clamped in position. The bracket portion 11, on the other hand, is bifurcated to form a slot 13 and the links of the bifurcation are rolled to form clamping beads or keepers 14 in which are received and firmly held the ends of a pivot pin 14 which bridges across the upper end of the slot.

A float 15 is arranged within the tank and comprises a float body of suitable form and size and which is attached to one end of a lever arm 16 which projects therefrom over the valve and contacts with the valve stem 8. The opposite or free end of this lever arm terminates in a hook 17 which engages the pin 14 between the beads, thus pivotally mounting the float for upward and downward movements in the float chamber. The hook 17 is disposed at an angle to the lever arm so as to adapt the float to be inserted and removed at an angle to the vertical to engage the hook with and disengage it from the pin, and so that when the float is in working position the hook will be positively engaged with the pin against accidental displacement. By this construction provision is made to adapt the float to be readily applied for use and as readily removed to allow access to the other parts within the float chamber for cleaning, repairs or replacement.

The delivery or siphon pipe 3 depends at its lower end 18 into the receiver to a point just below the water line level x—x, so that when the receiver is filled to this level the end 18 of the pipe will be sealed against access of air thereinto or discharge of liquid therefrom. At its upper end the pipe 3 is fixed to the bottom of the tank 4 and extends therethrough upwardly into the tank and is open at its extremity to provide a water inlet port 19. Removably mounted on this portion of the pipe and guarding the port therein is an air trap or siphon chamber 20. This chamber may be of any suitable form, but is shown as a chamber of oblong rectangular form closed at its sides, ends and top and open at its bottom end having its open bottom facing the bottom of the tank 4 and spaced therefrom and arranged at a suitable level thereabove. This trap chamber is preferably arranged transversely of the tank 4 adjacent to the valve fitting 7, and at the side thereof opposite the float 15, and the lever arm 16 extends over the top of this trap chamber.

As shown, this trap chamber has fixed thereto a coupling member 21 whereby it is removably mounted on the upper end of the pipe 3. This member 21 comprises a closed-top sleeve or cap which fits slidably down onto the upper end of the pipe 3 with its top overhanging and spaced from the port 19. The cap is of greater diameter than the pipe 3 and is provided with an annular series of longitudinal ribs 21a to frictionally engage the pipe 3 and which form a series of water flow passages for the upflow of water from the tank 4 upwardly into and from the lower end of the cap to the port 19. By this construction the trap chamber 20 and cap 21 are mounted so as to be firmly supported on the pipe 3 in service and so as to permit of their removal to expose the upper end of the pipe 3 and allow the pipe, trap chamber and cap to be conveniently cleaned when required.

In the normal working position of the parts with the receiver 1 filled to the level x—x, the lower end 18 of the pipe 3 will be submerged in and sealed by the liquid in the receiver, the float 15 in the chamber 4 will be up, because of the presence of water therein at a high level y—y, just above the top of the siphon or air trap chamber 20, and the valve 7, being relieved of pressure from the float, will be closed. In this position of the parts the upper portion of the chamber 20 and the upper portion of the pipe 3 will be filled with compressed air trapped therein as explained hereinafter, whereby any siphonic flow of liquid from chamber 4 to the receiver 1 is prevented. When, however, the level of the liquid in receiver 1 is lowered to or nearly to the level of end 18 of pipe 3, a siphonic action is established to cause the flow of liquid from the chamber 4 to the receiver 1. As the level of the liquid in chamber 4 is lowered the float 15 descends and opens the valve 7, so that liquid from the source of supply will flow through inlet conduit 5 and valve 7 into chamber 4. However, the inflow through valve 7 is at a lesser rate than the outflow through conduit 3 so that the liquid level in chamber 20 drops and reaches the lower level point Z—Z just below the bottom of trap chamber 20. At this time the siphon will be broken in chamber 20 and the siphonic action will stop.

Meanwhile, as the water rises in receiver 1 the lower end 18 of pipe 3 is sealed but the discharge of liquid from pipe 3 into receiver 1 continues until the siphonic action is broken by the lowering of the water in chamber 4 to level Z—Z as above explained. This continued discharge of liquid into receiver 1 raises the level therein above the end of pipe 3 by an amount indicated by H in Fig. 6. The flow of liquid from pipe 5 into the chamber 4 will continue until the float 15 is elevated to close the valve 7 at the time the high liquid level Y—Y in chamber 4 is again reached. This continued flow of liquid to restore the float 15 to normal position and close valve 7 is allowed without inflow of liquid into pipe 3, as the air in chamber 20 must be forced out through pipe 3 against the resistance imposed by the liquid head H in receiver 1. The air in chamber 20 is thus placed under a slight pressure equal to the liquid head H. Thus when the level in chamber 4 reaches the level Y—Y, the level within chamber 20, because of such slight air pressure, is depressed a distance H' below the level Y—Y, which distance H' is equal to the distance H. As shown in Fig. 6 such liquid level in chamber 20 is slightly below the upper end of conduit 3 and hence cannot start the siphonic action.

As the liquid level in the receiver 1 drops, due to consumption therefrom, the air pressure in chamber 20 decreases correspondingly and the liquid therein is permitted to rise. When the liquid level in receiver 1 drops so as to approach the level of the lower end 18 of conduit 3, the liquid in chamber 20 will rise above the upper end of conduit 3 and will start the siphonic action, thereby replenishing the liquid in receiver 1 and completing the cycle of operation.

From the foregoing description the construction and mode of operation of my improved liquid flow and level control apparatus will be readily understood without a further and extended description. The advantages of this apparatus are manifold. In the first place, the float chamber and control parts may be supported from the receiver or any other supporting means at any desired level above the receiver, so that such chamber and control parts will not occupy any space in the receiver and will be out of the way of and cannot be rendered inoperative by or interfered with by fowls or animals drinking from the receiver and so that the full area of the receiver will be exposed for use by the drinking fowls or animals. In the second place, the construction of the control apparatus is simple and embodies no parts liable to get easily out of order, and such control apparatus is compact, reliable and efficient in action, and may be manufactured and sold at a low cost. Furthermore, this control apparatus is adapted for use with any receiver, without requiring a special construction of receiver, and the parts thereof are readily accessible for cleaning, repairs, replacement or other purposes when required. Other advantages of this apparatus will also be readily apparent to those versed in the art without specific recitation.

It will, of course, be understood that the pipe 3 may be of any length to suit the arrangement of parts and it may be adjustable as to length, if desired. Where the pipe is made of fixed length it may be provided at its end 18 with an extension tube or sleeve 22 to adapt it to be adjusted to keep the liquid in the receiver at a lower level than that indicated as to allow the chamber 4 to be disposed at a higher level. Also the pipe 3 may be made of any suitable diameter to cause flow by either siphonic action or displacement. By using a tube 3 of small diameter the siphonic action described will be efficiently obtained. By making the tube 3 of sufficiently large diameter a replenishing action may be obtained without siphoning, by allowing the water to dribble over into the tube 3 as the water rises above the high level point in tank 4.

It is desirable to use the valve 5$^b$ for suitably throttling the water supply through pipe 5, as the pressure may vary in different localities from low gravity pressure to as much as 100% per square inch. The water supply should be at a rate considerably below the capacity of the siphon so that the siphon will have time to break its action. If the inflow is too heavy the siphon will not break, but will operate continually carrying air down with the water. This may be avoided by adjusting the needle valve to suitably control the supply, or, as shown in Fig. 9, a diaphragm 22 with a suitably sized hole may in some cases be used in place of the needle valve, as also shown in Fig. 9. This diaphragm may be clamped with a gasket 23 against a surface of a bored boss or coupling 5$^d$ fixed to tank 4, into which boss the pipe 5 is threaded. This boss may also receive and support the valve 6 and a strainer 24 may be arranged in the pipe adjacent to the diaphragm and gasket to prevent passage of foreign particles with the water to the valve.

It is apparent that one float chamber 4 can be constructed with more than one outlet assembly for the multiple control of water levels in as many different reservoirs 1 which might be located on the same or different levels.

While the construction as herein disclosed is preferred, it is to be understood that changes in the form, proportion or arrangement of parts falling within the scope of the appended claims may be made without departing from the spirit or sacrificing any of the advantages of the invention.

Having thus described my invention, I claim:

1. In a liquid flow control device, a liquid receiver, a float chamber disposed above the level of the receiver and having a liquid inlet, means float controlled and governed by the level of the liquid in the chamber for letting on or cutting off the flow of liquid to normally maintain a prescribed level of the liquid therein, a discharge conductor having an outlet end extending into the receiver to a level just below the liquid level to be maintained therein and having an inlet end disposed in the float chamber at a level slightly below the level normally maintained by the float controlled means in a cut off action thereof, and an air trap chamber in communication with and guarding the inlet of the discharge conductor, said trap chamber being closed except at its base and having an open base communicating with the float chamber below the inlet end of the discharge conductor.

2. An apparatus of the character described comprising a liquid receiver, a float chamber disposed at a level thereabove, a liquid inlet pipe communicating with the float chamber, a liquid outlet pipe leading from the float chamber and submerged at its outlet end in the liquid in said receiver just below the liquid level to be maintained therein, a valve for controlling the flow of liquid from the inlet pipe into the float chamber controlling said valve, and an air trap chamber in the float chamber guarding the inlet end of the outlet pipe, said chamber being open at its bottom and communicating at its bottom with the float chamber and at a level above its bottom with the inlet of the outlet pipe.

CONRAD JULIUS ROMBERG.